3,287,370
Patented Nov. 22, 1966

3,287,370
TETRAHYDROBENZOTHIEPINS
Richard J. Mohrbacher, Fort Washington, and Vasken Paragamian, Glenside, Pa., assignors to McNeil Laboratories, Incorporated, a corporation of Pennsylvania
No Drawing. Filed June 8, 1965, Ser. No. 462,414
19 Claims. (Cl. 260—327)

This invention relates to certain novel tetrahydrobenzothiepins. More particularly, this invention is concerned with tetrahydrobenzothiepins having the formula

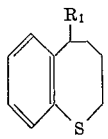

wherein $R_1$ is a member selected from the group consisting of amino, loweralkylamino, diloweralkylamino, aminoloweralkoxy, loweralkylaminoloweralkoxy, diloweralkylaminoloweralkoxy, loweralkylcarbonylaminoloweralkoxy, formamido, N-loweralkyl formamido, loweralkylcarbonylamino and N-loweralkyl loweralkylcarbonylamino; and non-toxic acid addition salts and loweralkyl quaternary ammonium derivatives of the basic nitrogen containing compounds. $R_1$ may also be benzamido, benzamidoloweralkoxy or N-loweralkylbenzamido.

As used herein loweralkyl may be straight or branch chained and have from 1 to 6 carbon atoms, such as, for example, methyl, ethyl, propyl, isopropyl, butyl, isobutyl, tertiary butyl and the like. By the term loweraliphatic carboxamide as used herein is meant

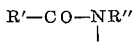

wherein R' and R'' are loweralkyl.

The therapeutically active non-toxic acid addition salts of the basic nitrogen containing compounds are prepared by treatment with an appropriate acid such as an inorganic acid, e.g., hydrochloric, hydrobromic, hydriodic, sulfuric, nitric or phosphoric; an organic acid such as acetic, propionic, glycolic, lactic, pyruvic, malonic, succinic, maleic, malic, fumaric, tartaric, citric, benzoic, mandelic, cinnamic, methane sulfonic, benzene sulfonic, salicylic, 2-phenoxybenzoic. Conversely, the salt form may be converted in the usual manner into the free base.

The novel basic nitrogen containing compounds may be converted into the corresponding quaternary ammonium compounds by reaction of the tertiary bases with alkylating agents, i.e., alkyl or aralkyl halides or esters formed by reacting alkanols with an oxygen-containing acid such as methyl iodide, ethyl bromide, propyl chloride; lower alkenyl halides—allyl bromide; dilower alkylsulfates—dimethylsulfate, diethylsulfate; lower alkylarylsulfonates—methyl p-toluenesulfonate or aralkyl halides—benzyl chloride. The quaternizing reaction may be performed in the presence or absence of a solvent, at room temperature or under cooling, at atmospheric pressure or in a closed vessel under pressure. Suitable solvents for this purpose are ethers such as benzene and heptane, ketones such as acetone and butanone, loweralkanols such as ethanol, propanol or butanol; or organic acid amides such as formamide or dimethylformamide. When lower alkyl halogenides are used as quaternizing agents, diethyl ether and benzene are the preferred solvents.

The compounds of this invention have valuable pharmacological properties in view of their hypotensive activity.

The compound of this invention wherein R is amino is prepared by reducing 3,4-dihydro-1-benzothiepin-5(2H)-one oxime with a reducing agent such as lithium aluminum hydride in a suitable solvent such as ether.

The compound wherein R is formamido is prepared by reacting 2,3,4,5-tetrahydro-1-benzothiepin-5-amine with a suitable formylating agent such as acetic-formic anhydride or formic acid. The N-methyl compound is prepared by reacting the formamido compound with a reducing agent such as lithium aluminum hydride in a solvent such as tetrahydrofuran.

The compound wherein R is N,N-dimethylamino is prepared by reducing the N-methyl formamido compound with a reducing agent such as lithium aluminum hydride in a suitable solvent such as ether or tetrahydrofuran.

The compounds of this invention wherein R is N-loweralkyl formamido are prepared by reacting a 2,3,4,5-tetrahydro-N-loweralkyl-1-benzothiepin-5-amine with a suitable formylating agent such as acetic-formic anhydride or formic acid.

The compounds of this invention wherein R is N,N-diloweralkylamino are prepared by reacting a N-loweralkyl-N - 2,3,4,5 - tetrahydro - 1 - benzothiepin - 5 - yl) loweraliphatic carboxamide with a reducing agent such as lithium aluminum hydride in a suitable solvent such as tetrahydrofuran.

The compounds of this invention wherein R is loweralkylcarbonylamino are prepared by reacting 2,3,4,5-tetrahydro-1-benzothiepin-5-amine with a suitable acylating agent such as a lower aliphatic carboxylic anhydride or a loweraliphatic carbonyl chloride under standard acylating conditions in the presence of a suitable organic solvent.

The compounds of this invention wherein R is loweralkylamino are prepared by reacting an N-(2,3,4,5-tetrahydro-1-benzothiepin-5-yl) - loweraliphatic carboxamide with a reducing agent such as lithium aluminum hydride in a suitable organic solvent such as tetrahydrofuran.

The compounds of this invention wherein R is N-loweralkyl loweralkylcarbonylamino are prepared by reacting an N - loweralkyl - 2,3,4,5 - tetrahydro - 1 - benzothiepin-5-amine with a suitable acylating agent such as a loweraliphatic carboxylic anhydride or a loweralkyl carbonyl chloride under standard acylating conditions in the presence of a suitable organic solvent.

The compounds of this invention wherein R is loweralkylaminoloweralkoxy or diloweralkylaminoloweralkoxy are prepared by reacting 2,3,4,5-tetrahydro-1-benzothiepin-5-ol with a strong base, for example, an alkali metal hydride, hydroxide, amide or alkoxide such as sodium hydride, potassium hydroxide, sodamide, or potassium tertiary butoxide in a suitable organic solvent such as an ether or a hydrocarbon or a lower alkanol for example, diethylether, benzene, tetrahydrofuran, ethanol or tertiary butanol, followed by reaction with the appropriate loweralkylamino-loweralkyl or diloweralkylaminoloweralkyl chloride.

The compounds of this invention wherein R is loweralkylaminoloweralkoxy may also be prepared by reacting an N-[(2,3,4,5-tetrahydro-1-benzothiepin-5-yl)oxy]loweralkyl phthalimide with hydrazine in a suitable solvent such as methanol. The phthalimide precursor is prepared by reacting 2,3,4,5 - tetrahydro - 1 - benzothiepin-5-ol with a strong alkalinizing agent such as sodium hydride in a suitable inert organic solvent such as toluene or any of the other strong alkalinizing agents mentioned hereinabove and thereafter reacting with an N-bromoloweralkyl phthalimide.

The compounds of this invention wherein R is loweralkylcarbonylaminoloweralkoxy are prepared by acylating an [(2,3,4,5 - tetrahydro-1-benzothiepin-5-yl)oxy]-loweralkylamine with a suitable acylating agent such as a loweraliphatic carboxylic anhydride or a loweralkyl carbonyl chloride under standard acylating conditions in the presence of a suitable organic solvent. The resulting N - [(2,3,4,5-tetrahydro-1-benzothiepin-5-yl)oxy]-loweralkyl loweraliphatic carboximide may then be reduced, for example with lithium aluminum hydride in a suitable inert organic solvent such as tetrahydrofuran to form the corresponding N - diloweralkyl - [(2,3,4,5 - tetrahydro-1-benzothiepin-5-yl)oxy]-amine.

In place of lithium aluminum hydride as a reducing agent in the foregoing procedures, reducing agents such as the boron hydrides, for example diborane or alkyl boranes; or alkali metal borohydrides combined with a Lewis acid, for example sodium borohydride-aluminum chloride, or potassium borohydride-boron trifluoride may be used. The solvent may be a suitable inert organic solvent such as tetrahydrofuran, diethyl ether, or ethylene glycol dimethyl ether.

The following examples are intended to illustrate, but not to limit, the scope of the present invention.

*Example I*

A solution of 11.2 g. (0.16 mole) of hydroxylamine hydrochloride in 16 ml. of water is added to a stirred slurry of 17.8 g. (0.1 mole) of 3,4-dihydro-1-benzothiepin-5(2H)-one in 60 ml. of 95% ethanol. Aqueous potassium hydroxide (15.7 g., 0.28 mole of potassium hydroxide in 15.7 ml. of water) is then added and the slurry is heated under reflux for 2 hours, cooled, poured into ice water and acidified with concentrated hydrochloric acid. White crystals form. The crystals are recovered by filtration. Three recrystallizations from 95% ethanol yield white crystals of 3,4-dihydro-1-benzothiepin-5(2H)-one oxime; M.P. 97–99° C.

*Example II*

A solution of 36 g. (0.186 mole) of 3,4-dihydro-1-benzothiepin-5(2H)-one oxime in 400 ml. of anhydrous ether is added over a period of 15 minutes to a stirred slurry of lithium aluminum hydride (15 g., 0.395 mole) in 600 ml. of ether. The slurry is then heated under reflux for 22 hours, cooled, decomposed with 45 ml. of water and filtered. The filtrate is concentrated in vacuo to give a yellow oil. A portion of the oil is dissolved in 2-propanol and added to methanolic hydrogen chlorine. Dilution with ether yields crystals. Two recrystallizations from methanol-2-propanol gives white crystals of 2,3,4,5-tetrahydro - 1 - benzothiepin-5-amine hydrochloride; M.P. 300° C.

*Example III*

A solution of 29 g. (0.14 mole) of N-(2,3,4,5-tetrahydro-1-benzothiepin-5-yl) formamide in 200 ml. of dry tetrahydrofuran is added slowly to a stirred slurry of 13.3 g. (0.35 mole) of lithium aluminum hydride in 500 ml. of freshly distilled tetrahydrofuran. The slurry is heated under reflux for 20 hours and then is decomposed with 40 ml. of water. After filtration, the filtrate is concentrated in vacuo to yield a golden oil. A 4.5 g. portion of the oil is dissolved in ether and added to a solution of fumaric acid in 2-propanol. The resulting crystals are recovered by filtration. After two recrystallizations from 2-propanol-ether, a white crystalline product, 2,3,4,5-tetrahydro - N - methyl-1-benzothiepin-5-amine fumarate is recovered; M.P. 149–150.5° C.

*Example IV*

Solid N-methyl-N-(2,3,4,5-tetrahydro-1-benzothiepin-5-yl) formamide (12.2 g., 0.055 mole) is added to a stirred slurry of lithium aluminum hydride (5.2 g., 0.138 mole) in ether. The slurry is heated under reflux for 18 hours, cooled, and decomposed with water. After filtration, the filtrate is concentrated in vacuo to yield a golden oil. The oil is dissolved in 2-propanol and treated with ethereal hydrogen chloride to give the hydrochloride salt. Two recrystallizations from 2-propanol-ether yield white crystals of 2,3,4,5-tetrahydro-N,N-dimethyl-1-benzothiepin-5-amine hydrochloride; M.P. 209.8–210.5° C.

*Example V*

An 8.7 g. (0.048 mole) sample of 2,3,4,5-tetrahydro-1-benzothiepin-5-ol in toluene solution is added dropwise to a suspension of 1.25 g. of sodium hydride (0.052 mole) in toluene over 45 minutes. The mixture is stirred at reflux for 4 hours, cooled to room temperature and then treated with a toluene solution containing an excess of diethylaminoethyl chloride. The mixture is refluxed with stirring for 12 hours, treated with 1 ml. of ethanol and poured onto ice. After standing, the layers are separated. The aqueous layer is extracted with benzene-ether solution and the combined organic layer is extracted with water and then with dilute hydrochloric acid. The acid layer is made basic with sodium hydroxide solution and extracted with ether-benzene solution. The ether-benzene solution is washed and dried (magnesium sulfate) and evaporated to an oil. Distillation affords a fraction boiling at 136–9° C./0.28 mm. which is treated with 1 equivalent of citric acid in ethanol. The resulting solid is recrystallized twice from ethanol-ether to give white crystals of 2 - [(2,3,4,5 - tetrahydro-1-benzothiepin-5-yl)oxy]-triethylamine citrate; M.P., 115–117° C.

*Example VI*

The sodium salt of 2,3,4,5-tetrahydro-1-benzothiepin-5-ol is prepared by heating under reflux 18 g. (0.1 mole) of the alcohol with 2.4 g. (0.1 mole) of sodium hydride in 300 ml. of toluene. The stirred slurry is cooled and a freshly prepared sample (11 g., 0.09 mole) of dimethylaminopropyl chloride in 200 ml. of toluene is added fairly rapidly. The slurry is stirred at room temperature for 1½ hours and then at reflux temperature for 18 hours. After cooling and decomposing with water, the mixture is filtered. The filtrate is concentrated in vacuo to a red oil. The oil is dissolved in dilute acid and the solution is washed with benzene-ether. The aqueous layer is made basic and extracted with benzene-ether. The resulting organic solution is washed with water, then with brine and then dried and concentrated in vacuo to give a golden oil. The oil, dissolved in methanol, is converted to the hydrochloride salt with ethereal hydrogen chloride. The salt is recrystallized several times from 2-propanol or ethanol to give crystals of 3-[(2,3,4,5-tetrahydro-1-benzothiepin-5-yl)oxy]-N,N-dimethylpropylamine hydrochloride hemihydrate; M.P. 144–146° C.

*Example VII*

A 25.1 g. (0.14 mole) sample of 2,3,4,5-tetrahydro-1-benzothiepin-5-amine is heated under reflux with 28 g. (0.56 mole) of formic acid for 3 hours. The formic acid is removed in vacuo. The residue is dissolved in ice-water and is then made strongly basic with sodium hydroxide. The basic solution is extracted with benzene. The organic layer is washed with water and brine and concentrated in vacuo. The orange oil is dissolved in ether and crystals are precipitated by cooling in the refrigerator to give crystals of N-(2,3,4,5-tetrahydro-1-benzothiepin-5-yl) formamide; M.P. 112–116° C.

By another procedure, the amine starting material (50.2 g., 0.28 mole) is heated under reflux for 5 hours with 145 g. (1.96 mole) of ethyl formate. The excess ethyl formate is removed in vacuo and the residue is triturated with ethyl acetate-ether to give crystals of N-(2,3,4,5-tetrahydro-1-benzothiepin-5-yl) formamide; M.P. 120–122° C.

*Example VIII*

A 23.3 g. (0.121 mole) sample of 2,3,4,5-tetrahydro-N-methyl-1-benzothiepin-5-amine is heated under reflux for 5 hours in 19 g. (0.4 mole) of formic acid. The excess formic acid is removed in vacuo. The residue is dissolved in ether, washed with dilute hydrochloric acid, then with dilute sodium hydroxide, brine, and then dried. Concentration of the ethereal solution in vacuo yields crystals. Methylene chloride extraction of both the acid and the basic layers yields another 5.5 g. of crystals. Three recrystallizations from benzene-ether produces white crystals of N-methyl-N-(2,3,4,5-tetrahydro-1-benzothiepin-5-yl) formamide; M.P. 93–96° C.

Example IX

A 25.1 g. (0.14 mole) sample of 2,3,4,5-tetrahydro-1-benzothiepin-5-amine in 200 ml. of ether is cooled in an ice bath. An ethereal solution of 18.5 g. (0.2 mole) of propionylchloride is added dropwise with stirring over 90 minutes. The resulting mixture is stirred at reflux temperature for 2 hours, cooled and filtered. The ethereal filtrate is washed 2 times with sodium bicarbonate, 2 times with water, once with saturated brine, and dried over sodium sulfate. After removal of the drying agent, the ether is removed in vacuo to give a material which is recrystallized from benzene-hexane or aqueous ethanol. The resulting product is colorless crystals of N-(2,3,4,5-tetrahydro-1-benzothiepin-5-yl)propionamide.

Example X

A solution of 23.4 g. (0.1 mole) of N-(2,3,4,5-tetrahydro-1-benzothiepin-5-yl)propionamide in 200 ml. of dry tetrahydrofuran is added slowly to a stirred slurry of 9.5 g. (0.25 mole) of lithium aluminum hydride in 500 ml. of freshly distilled tetrahydrofuran. The slurry is heated under reflux for 20 hours and then decomposed by careful addition of 29 ml. of water. After filtration, the filtrate is concentrated in vacuo to yield a golden oil. The oil is taken into ether and added to a solution of ethereal hydrogen chloride. The hydrochloride salt is recrystallized 2 times from methanol-ether to give white crystals of 2,3,4,5 - tetrahydro - N-propyl-1-benzothiepin-5-amine hydrochloride.

Example XI

A 17.6 g. (0.08 mole) sample of 2,3,4,5-tetrahydro-N-propyl-1-benzothiepin-5-amine is dissolved in excess acetic anhydride and heated on a steam bath for 4 hours. After removal of the excess acetic anhydride in vacuo, the gum is dissolved in benzene-ether. The solution is washed 2 times with sodium bicarbonate, twice with water and once with saturated brine. The solution is dried over magnesium sulfate and evaporated in vacuo to a crystalline mass. Recrystallization from benzene-hexane gives white crystals of N-propyl-N-(2,3,4,5-tetrahydro-1-benzothiepin-5-yl)acetamide.

Example XII

A solution of 13.1 g. (0.05 mole) of N-propyl-N-(2,3,4,5-tetrahydro-1-benzothiepin-5-yl)acetamide in 100 ml. of dry tetrahydrofuran is added slowly to a stirred slurry of 4.75 g. (0.125 mole) of lithium aluminum hydride in 250 ml. of freshly distilled tetrahydrofuran. The slurry is heated under reflux for 20 hours and then decomposed by careful addition of 15 ml. of water. After filtration, the filtrate is concentrated in vacuo to yield a golden oil. The oil is taken into methanol-ether and added to a solution of ethereal hydrogen chloride. The hydrochloride salt is recrystallized 2 times from methanol-ether to give white crystalline 2,3,4,5-tetrahydro-N-ethyl-N-propyl-1-benzothiepin-5-amine hydrochloride.

Example XIII

Using the procedure of Example VI and replacing dimethylaminopropyl chloride with equivalent amounts of dimethylaminoethyl chloride, diethylaminopropyl chloride and dipropylaminoethyl chloride, the products obtained are 2-[(2,3,4,5-tetrahydro-1-benzothiepin-5-yl)oxy]-N,N-dimethylethylamine, 3 - [(2,3,4,5-tetrahydro-1-benzothiepin-5-yl)oxy]-N,N-diethyl-propylamine, and 2-[(2,3,4,5-tetrahydro-1-benzothiepin-5-yl)oxy]-N,N-dipropyl - ethylamine in the form of the hydrochloride hemihydrate.

Example XIV

An 8.7 g. (0.048 mole) sample of 2,3,4,5-tetrahydro-1-benzothiepin-5-ol in toluene solution is added dropwise to a suspension of 1.25 g. of sodium hydride (0.052 mole) in toluene over 45 minutes. The mixture is stirred at reflux for 4 hours, cooled to room temperature and then treated with a toluene solution containing 12.7 g. (0.05 mole) of N-(2-bromoethyl)-phthalimide. The mixture is refluxed with stirring for 12 hours, treated with 1 ml. of ethanol and poured onto a mixture of ice and ammonium chloride solution. The aqueous layer is separated, washed with ether-benzene solution and the combined organic layer is washed successively with water, dilute sodium bicarbonate and finally water. After drying over sodium sulfate the organic solvents are removed in vacuo to give N-{2-[(2,3,4,5-tetrahydro-1-benzothiepin-5-yl)oxy]ethyl}-phthalimide.

Example XV

A 6 g. sample of N-2[(2,3,4,5-tetrahydro-1-benzothiepin-5-yl)oxy]-ethyl phthalimide and 30 ml. of 1 molar hydrazine hydrate in 10 ml. of ethanol is refluxed with stirring for 3 hours. After cooling in an ice-bath the insoluble 2,3-dihydrophthalazin-1,4-dione is removed by filtration and the filtrate is evaporated in vacuo with warming to remove solvent and excess hydrazine. The resultant oil is dissolved in dilute hydrochloric acid and the solution extracted with ether-benzene solution. The aqueous phase is made basic with 10% sodium hydroxide solution and the resulting oil is taken up in ether-benzene solution. After washing with water the organic phase is dried over sodium sulfate and evaporated to give 2-[(2,3,4,5-tetrahydro-1-benzothiepin - 5 - yl)oxy] - ethylamine.

Example XVI

Using the procedures of Examples XIV and XV and replacing N-(2-bromoethyl)phthalimide in Example XIV with an equivalent amount of N-(3-bromopropyl)phthalimide, the product obtained is 3-[(2,3,4,5-tetrahydro-1-benzothiepin-5-yl)oxy]-propylamine.

Example XVII

Using the procedure of Example IX and replacing 2,3,4,5-tetrahydro-1-benzothiepin-5-amine with an equivalent amount of 2-[(2,3,4,5-tetrahydro-1-benzothiepin-5-yl)oxy]-ethylamine, the product obtained is N-{2-[(2,3,4,5-tetrahydro-1-benzothiepin - 5 - yl)oxy] - ethyl} - propionamide.

Example XVIII

Using the procedure of Example X and replacing N-(2,3,4,5 - tetrahydro-1-benzothiepin - 5 - yl)propionamide with an equivalent amount of N-{2-[(2,3,4,5-tetrahydro-1-benzothiepin-5-yl)oxy]-ethyl}-propionamide, the product obtained is N-propyl-2-[(2,3,4,5-tetrahydro-1-benzothiepin-5-yl)oxy]-ethylamine.

What is claimed is:

1. A member selected from the group consisting of tetrahydrobenzothiepins having the formula

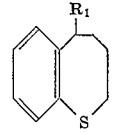

wherein $R_1$ is a member selected from the group consisting of amino, loweralkylamino, diloweralkylamino, aminoloweralkoxy, loweralkylaminoloweralkoxy, diloweralkylaminoloweralkoxy, loweralkylcarbonylaminoloweralkoxy, formamido, N-loweralkyl formamido, loweralkylcarbonylamino and N-loweralkyl loweralkylcarbonylamino; and non-toxic acid addition salts and lower-alkyl quaternary ammonium derivatives of the basic nitrogen containing compounds.

2. 2,3,4,5-tetrahydro-1-benzothiepin-5-amine.

3. 2,3,4,5 - tetrahydro - N - methyl - 1 - benzothiepin-5-amine.

4. 2,3,4,5 - tetrahydro - N,N - dimethyl - 1 - benzothiepin-5-amine.

5. 2 - [(2,3,4,5-tetrahydro - 1 - benzothiepin - 5 - yl)oxy]-triethylamine.

6. 3 - [(2,3,4,5 - tetrahydro - 1 - benzothiepin - 5 - yl)oxy]-N,N-dimethylpropylamine.

7. N - (2,3,4,5 - tetrahydro - 1 - benzothiepin - 5 - yl) formamide.

8. N - methyl - N - (2,3,4,5 - tetrahydro - 1 - benzothiepin-5-yl) formamide.

9. N - (2,3,4,5 - tetrahydro - 1 - benzothiepin - 5 - yl) propionamide.

10. 2,3,4,5 - tetrahydro - N - propyl - 1 - benzothiepin-5-amine hydrochloride.

11. N - propyl - N - (2,3,4,5 - tetrahydro - 1 - benzothiepin-5-yl) acetamide.

12. 2,3,4,5 - tetrahydro - N - ethyl - N - propyl - 1 - benzothiepin-5-amine hydrochloride.

13. 2 - [(2,3,4,5 - tetrahydro - 1 - benzothiepin - 5 - yl) oxy]-N,N-dimethyl-ethylamine.

14. 3 - [(2,3,4,5 - tetrahydro - 1 - benzothiepin - 5 - yl) oxy]-N,N-diethyl-propylamine.

15. 2 - [(2,3,4,5 - tetrahydro - 1 - benzothiepin - 5 - yl) oxy]-N,N-dipropyl-ethylamine.

16. 2 - [(2,3,4,5 - tetrahydro - 1 - benzothiepin - 5 - yl) oxy]-ethylamine.

17. 3 - [(2,3,4,5 - tetrahydro - 1 - benzothiepin - 5 - yl) oxy]-propylamine.

18. N - {2 - [(2,3,4,5 - tetrahydro - 1 - benzothiepin - 5-yl) oxy]-ethyl}-propionamide.

19. N - propyl - 2 - [(2,3,4,5 - tetrahydro - 1 - benzothiepin-5-yl) oxy]-ethylamine.

No references cited.

WALTER A. MODANCE, *Primary Examiner.*

JAMES A. PATTEN, *Assistant Examiner.*

UNITED STATES PATENT OFFICE
CERTIFICATE OF CORRECTION

Patent No. 3,287,370                             November 22, 1966

Richard J. Mohrbacher et al.

It is hereby certified that error appears in the above numbered patent requiring correction and that the said Letters Patent should read as corrected below.

Column 6, line 62, for "formadio" read -- formamido --.

Signed and sealed this 12th day of September 1967.

(SEAL)
Attest:

ERNEST W. SWIDER                                 EDWARD J. BRENNER
Attesting Officer                                       Commissioner of Patents